United States Patent [19]

Lenzen et al.

[11] Patent Number: 5,286,053
[45] Date of Patent: Feb. 15, 1994

[54] APPARATUS FOR PREVENTING UNDESIRED IGNITION OF A PYROTECHNIC TRANSMISSION LINE

[75] Inventors: Reiner Lenzen, Almont; Louis R. Brown, Oxford, both of Mich.

[73] Assignee: TRW Vehicle Safety Systems Inc., Lyndhurst, Ohio

[21] Appl. No.: 612,524

[22] Filed: Nov. 13, 1990

[51] Int. Cl.$^5$ .............................................. B60R 22/32
[52] U.S. Cl. ..................... 280/734; 280/806; 137/45; 137/115; 137/625.45; 102/275.2
[58] Field of Search ............. 280/728, 734, 735, 730, 280/731, 732, 806; 180/282; 137/38, 45, 539, 115, 625.45, 875; 251/324; 102/275.2-275.8

[56]  References Cited
U.S. PATENT DOCUMENTS

| 3,663,035 | 5/1972 | Norton | 280/734 |
| 3,792,872 | 2/1974 | Jones | 280/734 |
| 4,699,400 | 10/1987 | Adams et al. | 280/731 |

FOREIGN PATENT DOCUMENTS 3716168 11/1988 Fed. Rep. of Germany ...... 280/734

Primary Examiner—Karin L. Tyson
Attorney, Agent, or Firm—Tarolli, Sundheim & Covell

[57] ABSTRACT

An ignitable pyrotechnic transmission line, when ignited, actuates a vehicle safety device. A microdet receives a firing signal indicative of a vehicle collision and generates combustion products to ignite the pyrotechnic transmission line. A blocking member in the form of a slidable spool is interposed between the microdet and the pyrotechnic transmission line. The spool has a blocking position in which the spool prevents transmission of combustion products from the microdet to the pyrotechnic transmission line. The spool also has a non-blocking position in which the spool allows transmission of combustion products from the microdet to the pyrotechnic transmission line to ignite the pyrotechnic transmission line. The movement of the spool from the blocking position to the non-blocking position is controlled so that it moves only in the event of vehicle deceleration above a predetermined rate. Alternatively, the blocking member may be in the form of a pendulum interposed between the microdet and the pyrotechnic transmission line.

1 Claim, 3 Drawing Sheets

APPARATUS FOR PREVENTING UNDESIRED IGNITION OF A PYROTECHNIC TRANSMISSION LINE

BACKGROUND OF THE INVENTION

1. Technical Field

The present invention relates to an apparatus for protecting an occupant of a vehicle during a collision, and is particularly directed to an apparatus for preventing false ignition of an ignitable pyrotechnic transmission line which, when ignited, actuates a safety device.

2. Background Art

The use of an ignitable pyrotechnic transmission line to actuate a vehicle safety device is known. Typically, a pyrotechnic transmission line has one end connected to the safety device and the other end connected to a firing manifold. An ignitable blasting cap known as a microdet is disposed in the firing manifold. The microdet ignites when subjected to a firing signal of sufficient magnitude and duration. The firing signal of sufficient magnitude and duration is provided by a sensor which senses a vehicle collision. When ignited, the microdet generates gas and flame. The gas and flame ignite the pyrotechnic transmission line which in turn actuates the safety device.

A problem can arise if no actual vehicle collision has occurred, but the microdet nonetheless ignites. The resulting ignition of the pyrotechnic transmission line would cause undesired actuation of the safety device. Thus, it is desirable to ignite the pyrotechnic transmission line only in the event of an actual vehicle collision.

SUMMARY OF THE INVENTION

The present invention prevents undesired ignition of a pyrotechnic transmission line. In accordance with the present invention, the pyrotechnic transmission line is ignited when an ignitable means ignites. A passage connected between the ignitable means and the pyrotechnic transmission line directs combustion products of the ignitable means to the pyrotechnic transmission line to ignite the pyrotechnic transmission line. A blocking means is located between the ignitable means and the pyrotechnic transmission line. The blocking means has a blocking position in which the blocking means prevents transmission of combustion products of the ignitable means through the passage to the pyrotechnic transmission line. The blocking means also has a non-blocking position in which the blocking means allows transmission of combustion products of the ignitable means through the passage to the pyrotechnic transmission line. A vehicle deceleration sensing means controls movement of the blocking means so that the blocking means moves to its non-blocking position only if the vehicle encounters sufficient deceleration.

In one embodiment, the blocking means is a member which is moved by the combustion products of the ignitable means. The member is prevented from moving from the blocking position to the non-blocking position by a locking pawl. To enable movement of the blocking means, the locking pawl is moved in response to vehicle deceleration of at least a predetermined magnitude. In another embodiment, the blocking means is a surface of a pendulum and the mass of the pendulum controls movement of the pendulum. The pendulum pivots to move from its blocking position in response to inertial forces of at least a predetermined magnitude acting on the mass of the pendulum.

Preferably, the pyrotechnic transmission line is associated with an actuatable safety device such as an airbag inflator for, when actuated, protecting an occupant of a vehicle during a collision. The ignitable means is a microdet associated with the pyrotechnic transmission line for receiving a firing signal indicative of a vehicle collision and for generating combustion products to ignite the pyrotechnic transmission line. The blocking means is interposed between the microdet and the pyrotechnic transmission line.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENTS

Figure 1:
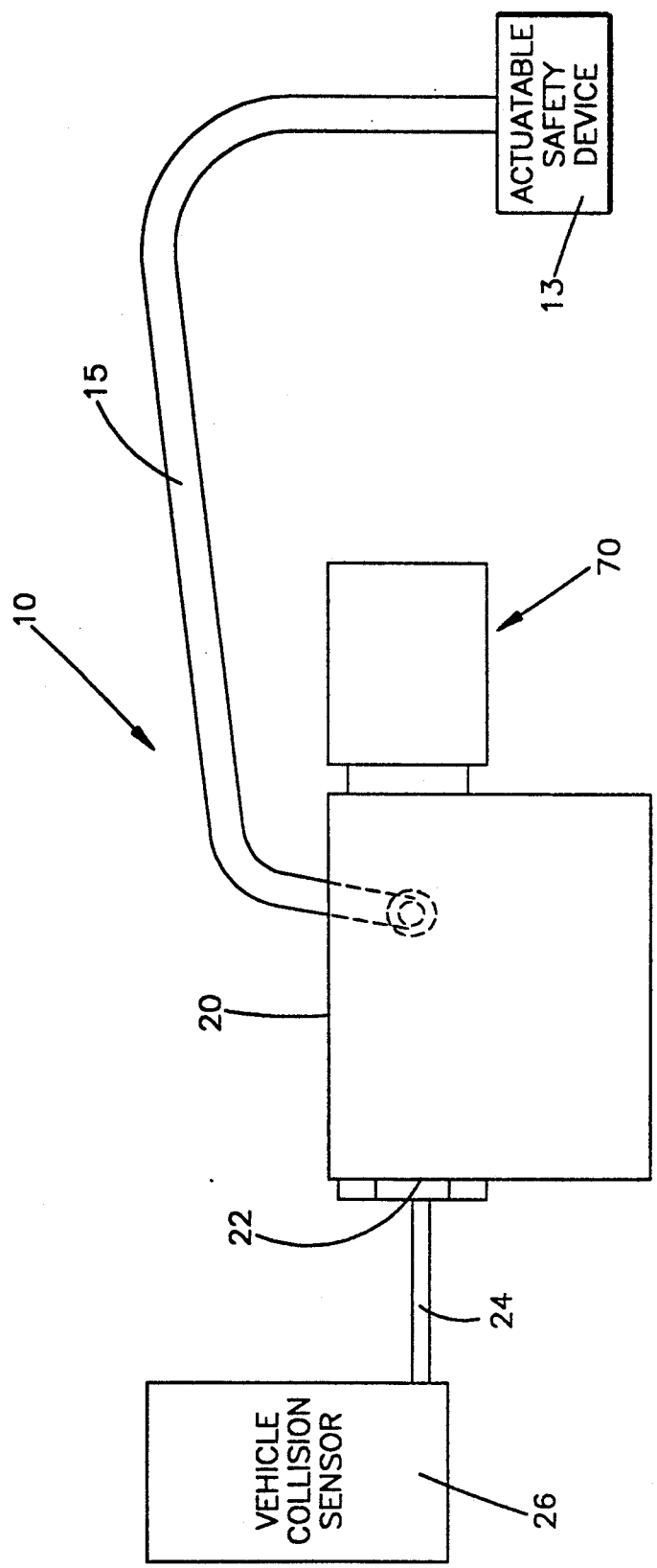
FIG. 1 is a schematic diagram of a portion of a vehicle safety system incorporating an apparatus constructed in accordance with the present invention.

As shown in FIG. 1, a vehicle safety system 10 includes an actuatable safety device 13 and an ignitable pyrotechnic transmission line 15 connected at one end to the safety device 13. The safety device 13 may be, for example, a seat belt pretensioner or an airbag inflator. A seat belt pretensioner, when actuated, pulls a seat belt tightly around a vehicle occupant in the event of a vehicle collision. An airbag inflator, when actuated, generates or releases gas which is directed into the interior of an inflatable airbag. The airbag inflates to protect a vehicle occupant during a vehicle collision.

The pyrotechnic transmission line 15 is made, for example, of a material called "TLX" (trademark, Explosive Technology, Inc. of Fairfield, Calif.). A TLX pyrotechnic transmission line includes a tube made of a plastic material which can withstand high temperature, such as "KYNAR" (trademark, E. I. DuPont de Nemours & Co. of Wilmington, Del.) or "HALAR" (trademark, E. I. DuPont de Nemours & Co. of Wilmington, Del.), in which a reactive coating is disposed. The reactive coating is made, for example, of a material including 10.5% aluminum powder and 89.5% "HMX". HMX is cyclotetramethylenetetranitramine.

When the pyrotechnic transmission line 15 ignites, the reactive coating burns. The flame propagates along the transmission line toward the safety device 13. When the flame reaches the safety device 13, the safety device 13 actuates. Thus, the safety device 13 actuates in response to ignition of the pyrotechnic transmission line 15.

Referring to FIGS. 1-4, the end of the pyrotechnic transmission line 15 not connected to the safety device 13 is connected to a firing manifold 20. The firing manifold 20 is preferably constructed of metal. The firing manifold 20 has a passage 44 (FIGS. 2 and 4) in which the end of the pyrotechnic transmission line 15 is positioned. The passage 44 communicates with a passage 40 in the firing manifold 20 which extends transverse to the passage 44.

A vent passage portion 42 (FIG. 3) extends transverse to the passage 40 and communicates with the passage 40. A vent passage portion 43 extends transverse to the vent passage portion 42 and communicates with the surrounding atmosphere external to the firing manifold 20. A movable metal ball 64 is located between the vent passage portion 42 and the vent passage portion 43. A compression spring 62 acts on the ball 64 in a direction to bias the ball 64 to a position which blocks communication between the vent passage portion 42 and the vent passage portion 43. When a pressure of sufficient magnitude in the vent passage portion 42 acts on the ball 64 against the biasing force of the spring 62, the ball 64 moves away from the position which blocks communication between the vent passage portions 42, 43.

The firing manifold 20 houses a blasting cap 22 known as a microdet. The microdet 22 ignites in response to a suitable energy signal. The microdet 22 is located at one end of the passage 40 and is spaced away from where the passage 44 communicates with the passage 40.

The microdet 22 is electrically connected through an electrical wire 24 to a vehicle collision sensor 26. The sensor 26 generates an electrical signal, herein referred to as a firing signal, in response to sensing a collision condition of the vehicle. The firing signal is transmitted over the electrical wire 24 to ignite the microdet 22. When ignited, the microdet 22 generates gas and flame. The gas and flame propagate through the passage 40 and the passage 44. When the gas pressure reaches the pyrotechnic transmission line 15, the pyrotechnic transmission line 15 ignites. The ignition of the microdet 22 therefore results in ignition of the pyrotechnic transmission line 15. Thus, upon the sensor 26 sensing a collision condition of the vehicle, the pyrotechnic transmission line 15 ignites and thereby actuates the safety device 13 to provide protection for an occupant of the vehicle.

Figure 2:
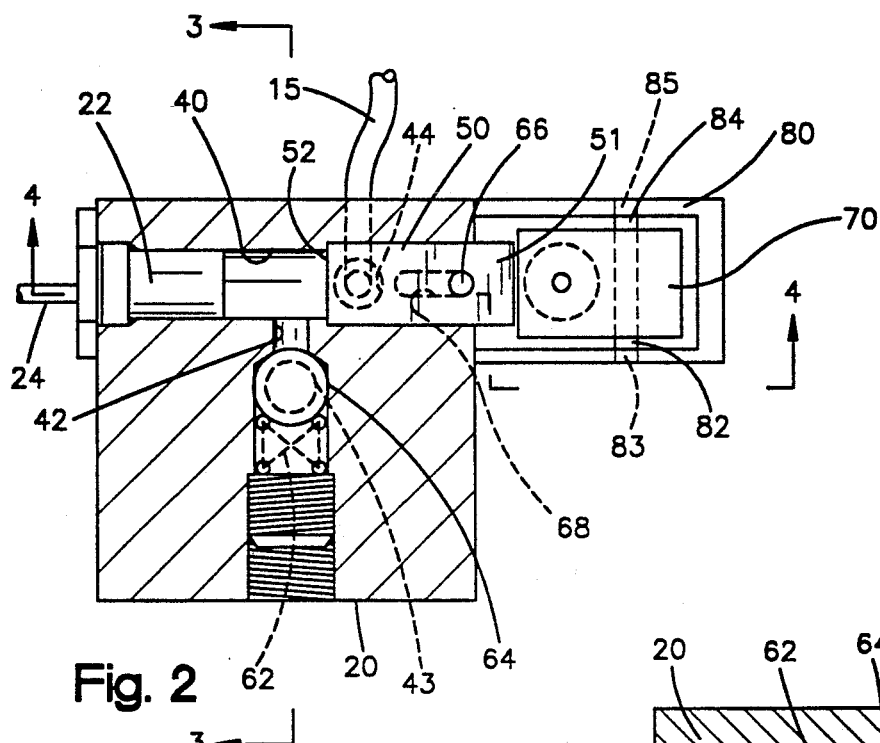
FIG. 2 is a view of a firing manifold used in the vehicle safety system of FIG. 1.
Figure 3:
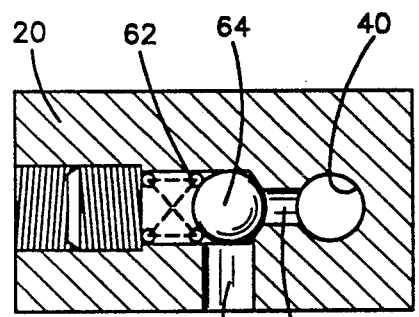
FIG. 3 is a sectional view of the firing manifold taken approximately along the line 3—3 of FIG. 2.
Figure 4:
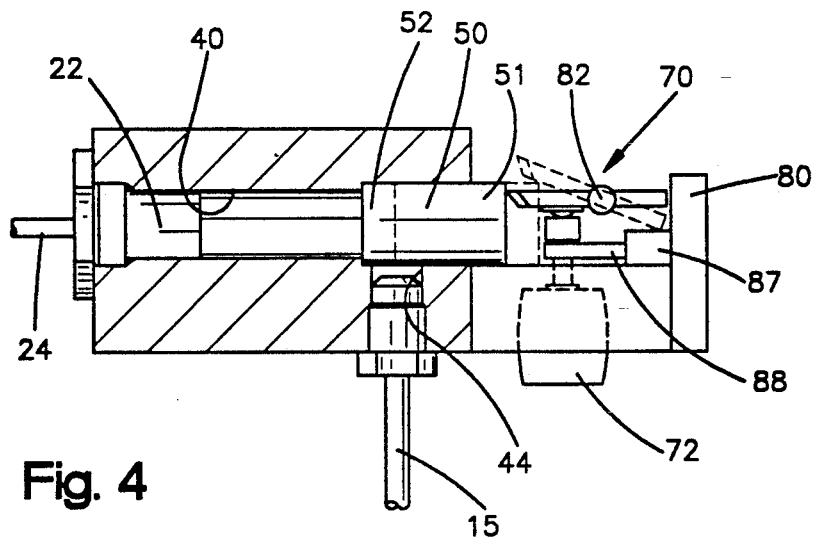
FIG. 4 is a sectional view with some parts removed of the firing manifold taken approximately along the line 4—4 of FIG. 2.

Referring to FIGS. 2-4, a blocking member 50 is located in the passage 40 of the firing manifold 20 and is interposed between the microdet 22 and the one end of the pyrotechnic transmission line 15 connected to the firing manifold 20. The blocking member 50 is slidably movable from a blocking position (shown in full lines in FIG. 4) to a non-blocking position (shown in dashed lines in FIG. 4). In the blocking position, the blocking member 50 prevents transmission of combustion products of the microdet 22 through the passages 40, 44 to the one end of the pyrotechnic transmission line 15. In the non-blocking position, the blocking member 50 allows transmission of combustion products of the microdet 22 through the passages 40, 44 to the one end of the pyrotechnic transmission line 15.

The blocking member 50 comprises a spool axially slidable in the passage 40. A dowel pin 66 extends into a slot 68 of the spool 50 and acts to guide and limit the axial sliding movement of the spool 50. The spool 50 is slidable between two positions corresponding to the blocking and non-blocking positions. In the non-blocking position of the spool 50, one end 52 of the spool 50 does not block communication between the passage 40 and the passage 44 leading to the pyrotechnic transmission line 15. When the spool 50 is in the non-blocking position, combustion products of the microdet 22 pass from the passage 40 to the passage 44 leading to the pyrotechnic transmission line 15.

In the blocking position of the spool 50, the one end 52 of the spool 50 blocks communication between the passage 40 and the passage 44 leading to the pyrotechnic transmission line 15. If the spool 50 is in the blocking position and the microdet 22 ignites, the combustion products of the microdet 22 pass from the passage 40 to the vent passage portion 42. The pressure of the combustion products of the microdet 22 act against the biasing force of the compression spring 62 to move the ball 64 away from its position blocking communication between the vent passage portions 42, 43. After the ball 64 moves from the position which blocks communication between the vent passage portions 42, 43, the combustion products of the microdet 22 pass from the vent passage portion 42 to the vent passage portion 43 leading to the surrounding atmosphere external to the firing manifold 20.

The other end 51 of the spool 50 is located adjacent a lock pawl 70. The lock pawl 70 is pivotably mounted to a housing portion 80 of the firing manifold 20. One end of a stub shaft 82 is connected to on side of the lock pawl 70. The other end of the stub shaft 82 extends into a groove 83 formed in the housing portion 80. One end of a second stub shaft 84 is connected to the opposite side of the lock pawl 70. The other end of the stub shaft 84 extends into a groove 85 formed in the housing portion 80. The lock pawl 70 pivots about an axis extending through the stub shafts 82, 84.

The lock pawl 70 is movable between a locked condition (shown in full lines in FIG. 4) and an unlocked condition (shown in dashed lines in FIG. 4). A block portion 87 fixed to the housing portion 80 limits the travel of the lock pawl 70 from the locked condition to the unlocked condition. When the lock pawl 70 is in the locked condition, the spool 50 is in its blocking position which blocks communication between the passage 40 and the passage 44 leading to the pyrotechnic transmission line 15. The spool 50 cannot move from the blocking position because the lock pawl 70 engages the spool 50 and prevents it from moving. When the lock pawl 70 is in the unlocked condition, the spool 50 is able to move from the blocking position to the non-blocking position which allows communication between the passage 40 and the passage 44 leading to the pyrotechnic transmission line 15.

A pendulum 72 is operatively coupled through an actuator arrangement 88 to the lock pawl 70. The pendulum 72 is swingable from a rest condition (best shown in FIG. 4) in the event of vehicle deceleration above a predetermined rate. The lock pawl 70 is in the locked condition when the pendulum 72 is in the rest condition. When the pendulum 72 swings at least a predetermined amount from its rest position shown in FIG. 4, the actuator arrangement 88 moves the lock pawl 70 from the locked condition to the unlocked condition thereby to allow axial sliding movement of the spool 50 from its blocking position to its non-blocking position.

When axial sliding movement of the spool 50 is allowed, the explosive force of the combustion products of the microdet 22 slides the spool 50 from the blocking position to the non-blocking position. Combustion products of the microdet 22 in the passage 40 are thereby directed to the passage 44 and to the pyrotechnic transmission line 15, thus igniting the pyrotechnic transmission line 15. Thus, when the pendulum 72 swings at least a predetermined amount, the explosive force of the combustion products of the microdet 22 acting on the spool 50 moves the spool 50 from the blocking position to the non-blocking position. Such movement of the spool 50 allows transmission of combustion products of the microdet 22 from the passage 40 to the passage 44 leading to the pyrotechnic transmission line 15.

By providing the spool 50, there is no communication between the passage 40 and the passage 44 leading to the pyrotechnic transmission line 15 unless the pendulum 72 swings at least the predetermined amount such as in the case of an actual vehicle collision. By not allowing the passage 40 to communicate with the passage 44 leading to the pyrotechnic transmission line 15 unless the pendulum 72 swings at least the predetermined amount, undesired ignition of the pyrotechnic transmission line 15 in response to accidental ignition of the microdet 22 is prevented. Since the pyrotechnic transmission line 15 is prevented from igniting, the safety device 13 connected to the pyrotechnic transmission line 15 is also blocked from undesired actuation. Thus, the safety device 13 actuates only in the event of an actual vehicle collision.

Figure 5:
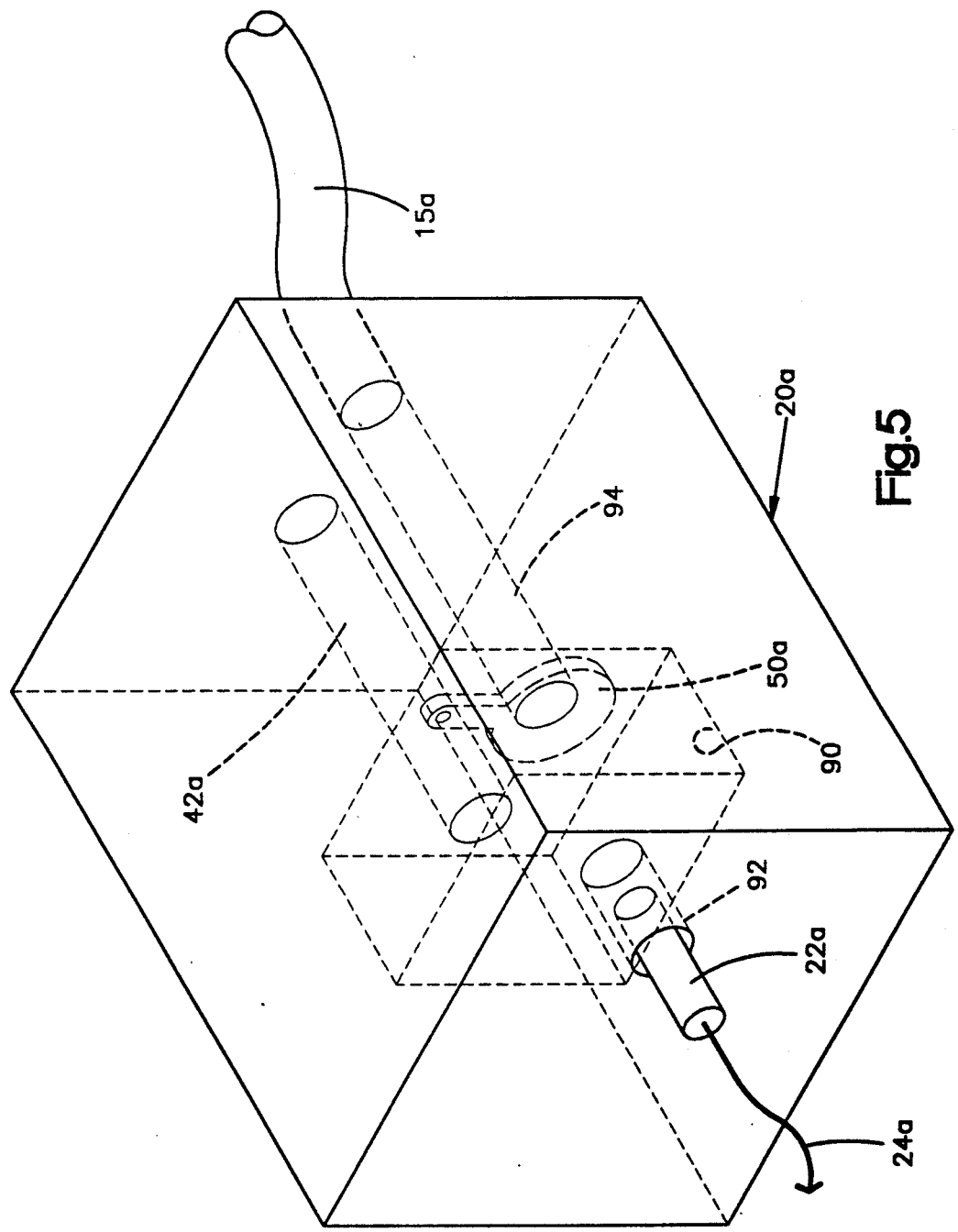
FIG. 5 is a perspective view illustrating another embodiment of the present invention.

Another embodiment of the present invention is illustrated in FIG. 5 Since the embodiment illustrated in FIG. 5 is generally similar to the embodiment illustrated in FIGS. 1-4, similar numerals are utilized to designate similar components, the suffix letter "a" being added to the numerals associated with the embodiment of FIG. 5. The firing manifold 20a has a chamber 90. A passage 94 communicates between the chamber 90 and the pyrotechnic transmission line 15a. A passage 92 that opens into the chamber 90 opposite the passage 94 communicates between the chamber 90 and the microdet 22a. The vent passage 42a communicates between the chamber 90 and the surrounding atmosphere external to the firing manifold 20a. Also, an arrangement (not shown in FIG. 5) of a ball and a compression spring acting on the steel ball, similar to the arrangement described hereinabove for the embodiment of FIGS. 1-4, is disposed in the vent passage 42a. The ball and the compression spring cooperate to block transmission of combustion products of the microdet 22a through the vent passage 42a when the blocking member 50a is in its non-blocking position. The ball and spring cooperate to allow transmission of combustion products of the microdet 22a through the vent passage 42a when the blocking member 50a is in its blocking position.

The blocking member 50a is located in the chamber 90 and is interposed between the passage 94 and the passage 92. The blocking member 50a is a pendulum pivotably mounted within the chamber 90. A surface of the pendulum 50a blocks movement of the combustion products of the microdet 22a from the chamber 90 to the passage 94. The mass of the pendulum 50a controls movement of the pendulum 50a in response to vehicle deceleration.

When the microdet 22a ignites in response to a firing signal on the electrical wire 24a, combustion products of the microdet 22a pass through the passage 92 into the chamber 90. If the pendulum 50a is in the blocking position, the pendulum 50a prevents transmission of combustion products of the microdet 22a from the chamber 90 through the passage 94 to the pyrotechnic transmission line 15a. If the pendulum 50a is in the non-blocking position, the pendulum 50a allows transmission of combustion products of the microdet 22a from the chamber 90 through the passage 94 to the pyrotechnic transmission line 15a. The pendulum 50a swings from the blocking position to the non-blocking position when inertial forces of at least a predetermined magnitude act on the pendulum 50a.

When the pendulum 50a is in the non-blocking position and the microdet 22a ignites, the combustion products of the microdet 22a pass through the passage 92 into the chamber 90. The combustion products then travel through the passage 94 to the one end of the pyrotechnic transmission line 15a thereby to ignite the pyrotechnic transmission line 15a. When the pendulum 50a is in the blocking position and the microdet 22a ignites, the combustion products of the microdet 22a also pass through the passage 92 into the chamber 90. The combustion products then travel through the vent passage 42a leading to the surrounding atmosphere external to the firing manifold 20a. Thus, the combustion products of the microdet 22a do not reach the one end of the pyrotechnic transmission line 15a to ignite the pyrotechnic transmission line 15a when the pendulum 50a is in the blocking position and the microdet 22a ignites.

From the above description of the present invention, those skilled in the art will perceive improvements, changes and modifications. Such improvements, changes and modifications within the skill of the art are intended to be covered by the appended claims.

Having described preferred embodiments of the invention, the following is claimed:

1. An apparatus comprising:
   an actuatable safety device for, when actuated, protecting an occupant of a vehicle;
   an ignitable pyrotechnic transmission line associated with said safety device for, when ignited, actuating said safety device;
   firing means for igniting said pyrotechnic transmission line in response to a signal indicative of vehicle deceleration above a predetermined rate, said firing means including an ignitable microdet which ignites in response to said firing means receiving said signal;
   means defining a passage between said microdet and said pyrotechnic transmission line for directing combustion products of said microdet to said pyrotechnic transmission line;
   blocking means located between said microdet and said pyrotechnic transmission line for controlling ignition of said pyrotechnic transmission line;
   said blocking means including a blocking member located in said passage and movable from a blocking position in which said blocking member prevents ignition of said pyrotechnic transmission line by ignition of said microdet to a non-blocking position in which said blocking member allows ignition of said pyrotechnic transmission line by ignition of said microdet, said non-blocking position of said blocking member being spaced apart from said blocking position of said blocking member;
   said blocking means including supporting means for enabling movement of said blocking member from said blocking position to said non-blocking position when the vehicle decelerates above said predetermined rate and said microdet ignites;
   said blocking member comprising a spool located in said passage for blocking combustion products of said microdet from being transmitted to said pyrotechnic transmission line when said spool is in said blocking position; and
   a pivotably mounted pendulum and a locking pawl having a position preventing movement of said spool from said blocking position, said pendulum pivoting to move said locking pawl to enable said spool to move away from said blocking position.

* * * * *